United States Patent
Cornell et al.

(10) Patent No.: US 10,116,681 B2
(45) Date of Patent: Oct. 30, 2018

(54) METHOD OF DETECTING SHARED VULNERABLE CODE

(71) Applicant: Denim Group, Ltd., San Antonio, TX (US)

(72) Inventors: Dan Cornell, San Antonio, TX (US); Sinh Nhat Tran, San Antonio, TX (US)

(73) Assignee: Denim Group, Ltd.

( * ) Notice: Subject to any disclaimer, the term of this patent is extended or adjusted under 35 U.S.C. 154(b) by 0 days.

(21) Appl. No.: 15/387,012

(22) Filed: Dec. 21, 2016

(65) Prior Publication Data

US 2018/0176245 A1 Jun. 21, 2018

(51) Int. Cl.
*H04L 29/06* (2006.01)
*G06Q 10/06* (2012.01)

(52) U.S. Cl.
CPC ......... *H04L 63/1433* (2013.01); *G06Q 10/06* (2013.01); *H04L 63/1425* (2013.01)

(58) Field of Classification Search
CPC ............... G06F 21/577; H04L 63/1433; H04L 63/1425; G06Q 10/06
USPC .......................................................... 726/25
See application file for complete search history.

(56) References Cited

U.S. PATENT DOCUMENTS

| | | |
|---|---|---|
| 9,507,943 B1 | 11/2016 | Allen |
| 9,525,698 B2 | 12/2016 | Crosby et al. |
| 2002/0147803 A1* | 10/2002 | Dodd ................... G06F 21/577 709/223 |
| 2007/0067848 A1* | 3/2007 | Gustave ................ G06F 21/577 726/25 |
| 2012/0210434 A1 | 8/2012 | Curtis et al. |
| 2013/0091541 A1 | 4/2013 | Beskrovny et al. |
| 2013/0227695 A1 | 8/2013 | Shankar |

(Continued)

FOREIGN PATENT DOCUMENTS

WO  2016113663 A1  7/2016

OTHER PUBLICATIONS https://www.blackducksoftware.com/products/hub; Aug. 8, 2018.
(Continued)

*Primary Examiner* — Kambiz Zand
*Assistant Examiner* — Aubrey H Wyszynski
(74) *Attorney, Agent, or Firm* — Gunn, Lee & Cave, PC (57) ABSTRACT

A method of detecting shared vulnerable code across a plurality of applications to efficiently facilitate remediation of such shared vulnerabilities by the appropriate development teams. The method includes the steps of creating a consolidated vulnerability database populated with vulnerability testing results of a plurality of applications; comparing each vulnerability testing result within the consolidated vulnerability database to match vulnerability locations and the number of data/control flow elements; assigning a confidence to each vulnerability within the consolidated vulnerability database based on vulnerability location matches and data/control flow element matches; assigning a severity to each vulnerability within the consolidated vulnerability database; assigning a criticality to each of the plurality of applications; and creating a database of risk-ranked, confidence-scored vulnerabilities based on the confidence assigned to each vulnerability, the severity of each vulnerability, and the criticality of each application.

8 Claims, 6 Drawing Sheets

(56) References Cited

U.S. PATENT DOCUMENTS

2015/0309813 A1   10/2015  Patel
2016/0191550 A1    6/2016  Ismael et al.
2016/0246965 A1*  8/2016  Cornell ................ G06F 21/577

OTHER PUBLICATIONS https://www.sonatype.com/nexus-intelligence; Aug. 8, 2018.
https://www.whitesourcesoftware.com/how-does-it-work/; Aug. 8, 2018.

* cited by examiner

METHOD OF DETECTING SHARED VULNERABLE CODE

CROSS REFERENCES TO RELATED APPLICATIONS

This application incorporates by reference U.S. Published Application 2016/0246965.

FEDERALLY-SPONSORED RESEARCH

Not applicable.

BACKGROUND OF THE INVENTION

1. Field of the Invention

This invention relates generally to application security. More specifically, this invention relates to a method of identifying vulnerabilities in code shared between development teams to facilitate efficient remediation of such vulnerabilities.

2. Description of the Related Art

Figure 1:
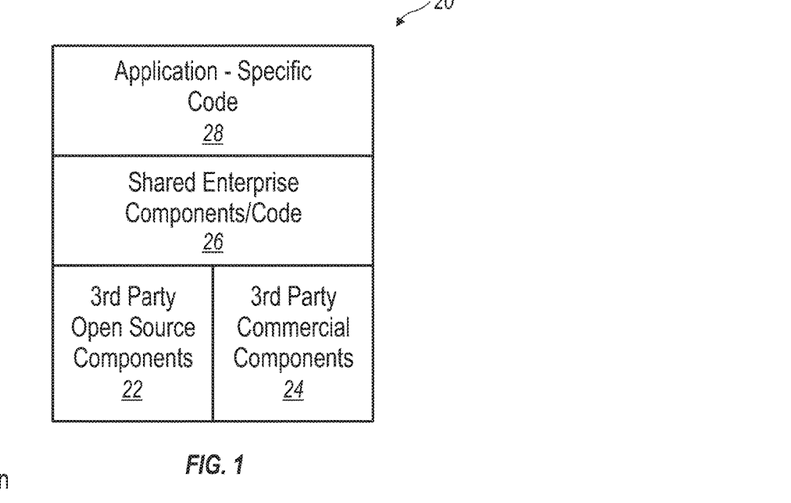
FIG. 1 is a block diagram showing composition of a software application reflecting the various origins of portions of the source code.

Many organizations develop software using third-party components of both commercial and open source origins, as well as code developed by the organization itself. FIG. 1, for example, shows an exemplary composition of a software application 20 reflecting the various origins of portions of the source code. The application 20 includes open source components 22 and commercial components 24 developed by and acquired from third parties, and which may or may not be used in other applications developed by the organization. In addition, most applications will include application-specific code 28.

Figure 2:
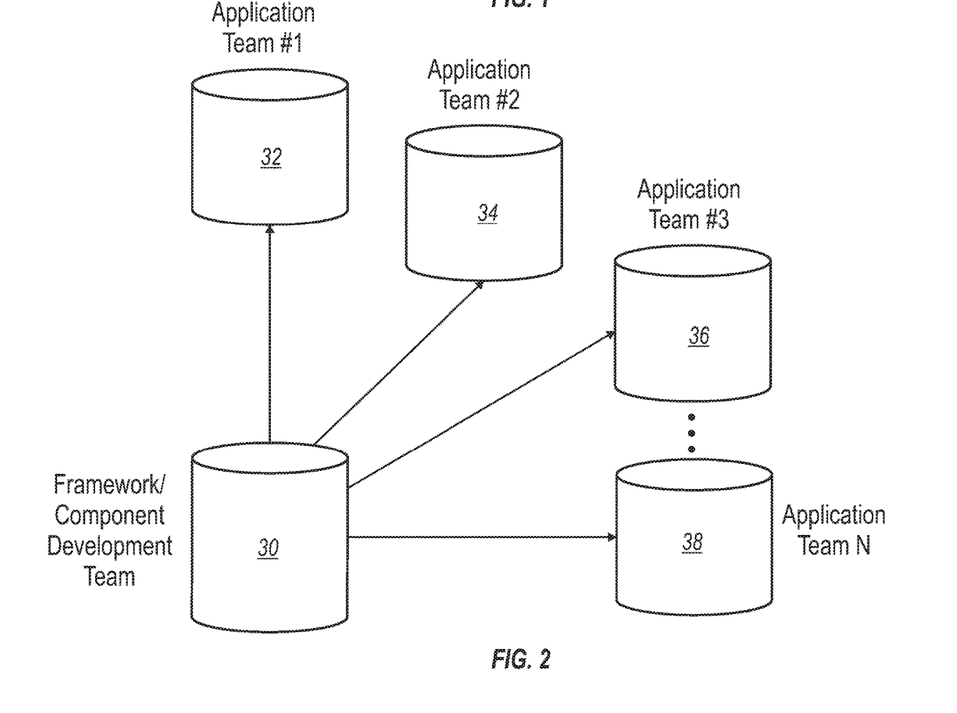
FIG. 2 is a schematic diagram showing how a particular component of code may be distributed to and used by different application teams for different applications.

The application 20 also includes components/code 26 internally developed by the organization, which may be used in other applications developed by the organization. In many organizations, for example, dedicated teams will develop frameworks or components that are used by other teams within the organization developing applications. In other cases, code is shared between teams in a less formal manner. FIG. 2, for example, illustrates how a shared code library 30 managed by a development team may be distributed to specific application projects 32, 34, 36, 38 managed by different application teams.

Regardless of whether the shared code is sourced from a third party or developed within the organization, such software often contains security vulnerabilities. These vulnerabilities may allow malicious actors, or "attackers," to breach users' expectations of confidentiality, integrity, or availability of the application. But while attackers typically do not care where the vulnerabilities occur in source code, the location of the vulnerabilities matters to defenders trying to remediate code and reduce risk.

The level of difficulty in fixing vulnerabilities depends on who developed the code. For example, vulnerabilities in code developed by a team that owns an application (e.g., the application specific code 28 of FIG. 1) are typically easier because the team controls the changes that are being made to the code base and can fix the code in a future release. But fixing vulnerabilities in code developed in-house but by other teams (e.g., the shared enterprise components/code 26 in FIG. 1) can be more difficult because a fix must often be applied by the team that owns the shared code and that fix needs to migrate downstream to the end-user application. Similarly, vulnerabilities identified in third-party components (FIG. 1 items 22, 24) can be challenging to fix because they typically require the original supplier of the code to make a code-level fix and then distribute an updated version of the source code or compiled component.

To locate vulnerabilities, organizations do testing of individual applications that shows the location of vulnerabilities in the composition of that specific application. This testing performs different types of analysis including fuzzing, semantic, data flow, and control flow analysis that demonstrates the attack surface locations of vulnerabilities and the paths that tainted inputs take through applications resulting in a weakness that could potentially be exploited by attackers. The applications being analyzed can include both shared code as well as application-specific code, such as shown in the software application 20 of FIG. 1. Data and control flows may cross through both shared and application-specific code and semantic analysis can highlight potential weaknesses in either shared or application-specific code as well.

Figure 3:
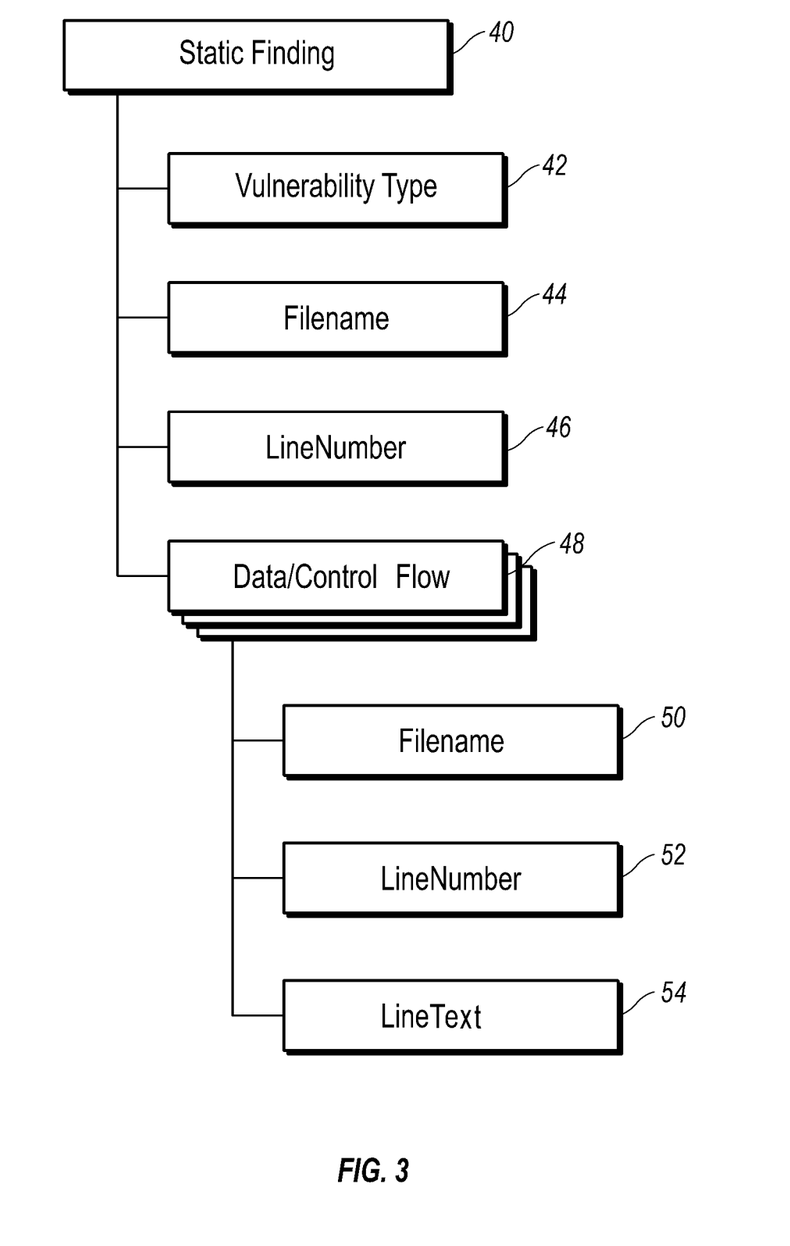
FIG. 3 shows a Static Finding data structure.

There are a number of different attributes of identified vulnerabilities, which vary somewhat depending on the type of testing. For example, vulnerabilities identified by dynamic application security testing (DAST) analysis for web-based applications tend to have attack surface information that includes vulnerability type, the relative URL of the vulnerability within the application, and, for certain classes of vulnerabilities, the injection point into the application. Vulnerabilities identified by static application security testing (SAST) analysis tend to have code location information that includes the vulnerability type and the data or control flow path that attacks take through the application. FIG. 3, for example, shows a typical Static Finding object 40 that may be returned by a static scanner. The Static Finding object 40 includes a vulnerability type object 42, a filename object 44, line number object 46, and one or more control/data flow objects 48 associated with a detected vulnerability. In turn, data or control flow paths tend to have several pieces of information including the file name or package 50, the line number 52 and/or column number where the vulnerability can be found, and the line text 54 containing a portion of the source code. Vulnerabilities identified by Interactive Application Security Testing (IAST) will have a combination of the characteristics of both DAST and SAST vulnerability results.

Fixing vulnerabilities often takes significant resources. These resources are typically limited, so there is value in and a need for efficiently identifying the most critical vulnerabilities to remediate to maximize the risk reduction for the level of effort expended.

BRIEF SUMMARY

The present invention provides a method by which organizations can leverage the results of the testing of disparate applications to generate deeper insight into the risks presented to the organization, and the highest value activities that can be undertaken to reduce those risks. The method includes creating a consolidated vulnerability database populated with vulnerability testing results of a plurality of applications; comparing at least one of the filename, the line number, and the line text associated with each vulnerability within the consolidated vulnerability database to the filename, line number, and line text associated with every other vulnerability within the consolidated vulnerability database and recording any filename, line number, and line text matches as vulnerability location matches; comparing the number of data/control flow elements of each of the plurality of applications to the number of data/control flow elements of every other of the plurality of applications and recording any matches as data/control flow element matches; assigning a confidence to each vulnerability within the consolidated vulnerability database based on vulnerability location matches and data/control flow element matches; assigning a severity to each vulnerability within the consolidated vulnerability database; assigning a criticality to each of the plurality of applications; and creating a database of risk-ranked, confidence-scored vulnerabilities based on the confidence assigned to each vulnerability, the severity of each vulnerability, and the criticality of each application.

BRIEF DESCRIPTION OF THE DRAWINGS

FIG. 4, which consists of FIG. 4A and FIG. 4B, shows an embodiment of the method of the present invention.

DETAILED DESCRIPTION OF CERTAIN EMBODIMENTS

Figure 4A:
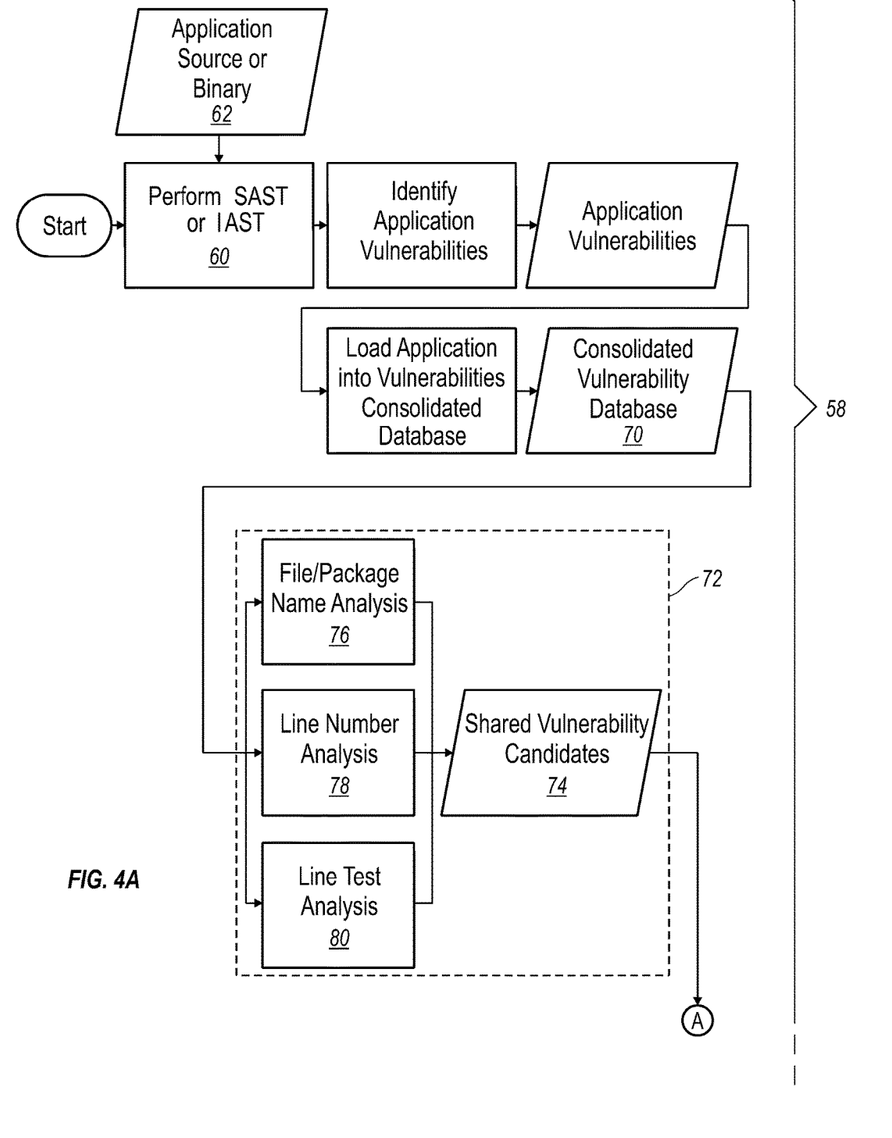

Referring to FIG. 4A, an embodiment 58 of the invention includes the first step of performing either static analysis security testing (SAST) or interactive application security testing (IAST) 60 on at least two applications 62 within the organization. The SAST or IAST vulnerability results are then added to a consolidated vulnerability database 70.

In step 72, the method identifies shared vulnerability candidates 74 using the database 70. This is done by matching file name and line number (step 76) of vulnerabilities located within multiple applications. However, if applications are consuming different versions of shared components, matching only the file/package name and line number may not be correct, as line numbers could have changed between versions if code above or below the line in question had been added or removed.

Figure 5:
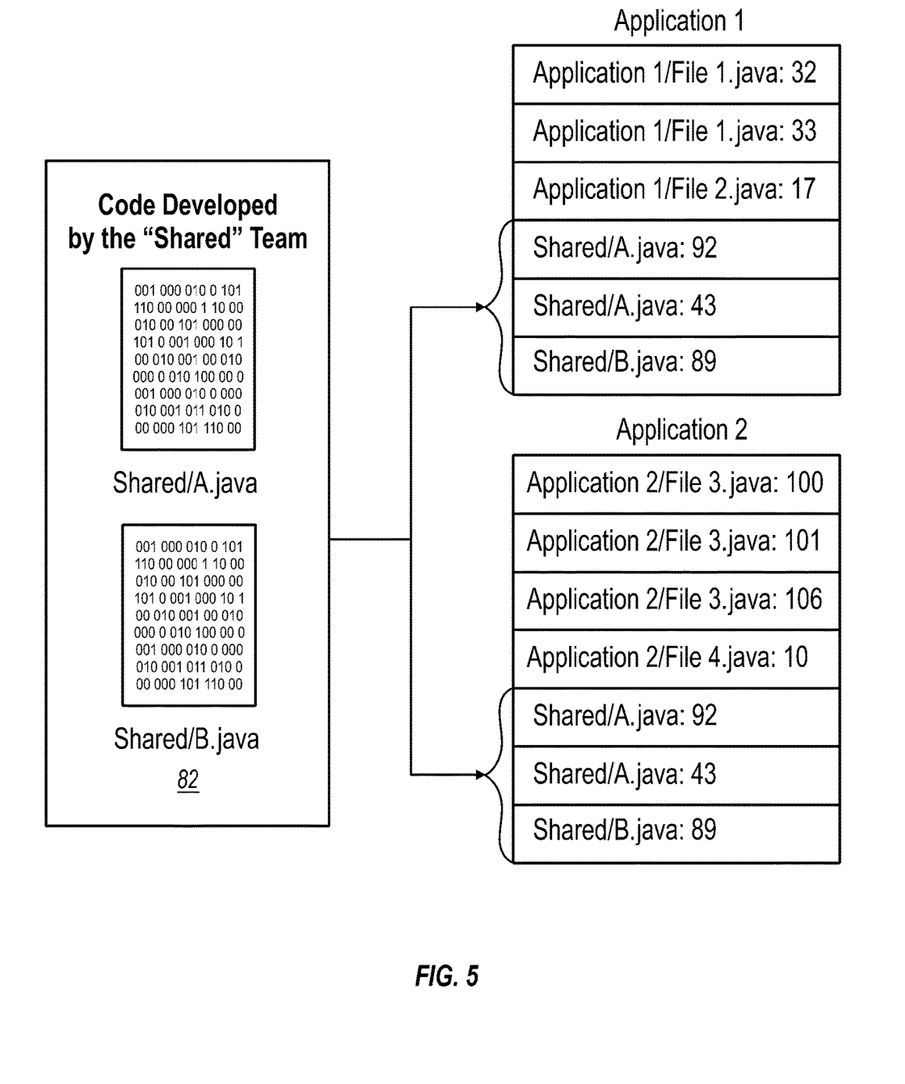
FIG. 5 depicts an example of a shared vulnerability found in two applications based on their consumption of shared code from a common library.

Referring to FIG. 5, a shared component 82 has code in files "shared/A.java" and "shared/B.java." Downstream Application 1 has application-specific code in files Application1/File1.java, Application1/File1.java. Downstream Application 2 has application-specific code in files Application2/File3.java and Application2/File4.java. Static application security testing (SAST) or interactive application security testing (IAST) of Application 1 reveals six vulnerabilities and static testing of Application 2 reveals seven vulnerabilities, which are contained within the consolidated vulnerabilities database 70. By looking at the data flows and control flows in each table, the method identifies where vulnerabilities terminate in shared code for both applications (the bottom rows 3 rows of each table), the inference being that the vulnerability exists because of that shared code and that fixing the shared code would result in the vulnerability being successfully remediated.

In addition to step 76, the embodiment 58 may match file name (step 76) and line text (step 78) in the test results for each application contained in the consolidated vulnerabilities database 70. Matching line text provides some reasonable evidence of a shared vulnerability, but can report false positives in cases where code is "cut-and-paste" reused within a given source file. These matches provide strong evidence that a vulnerability is shared, but can result in false negatives (i.e., missed matches) in cases where vulnerabilities exist in different versions of a shared component, and specific line numbers have changed because of file changes between versions.

Figure 4B:
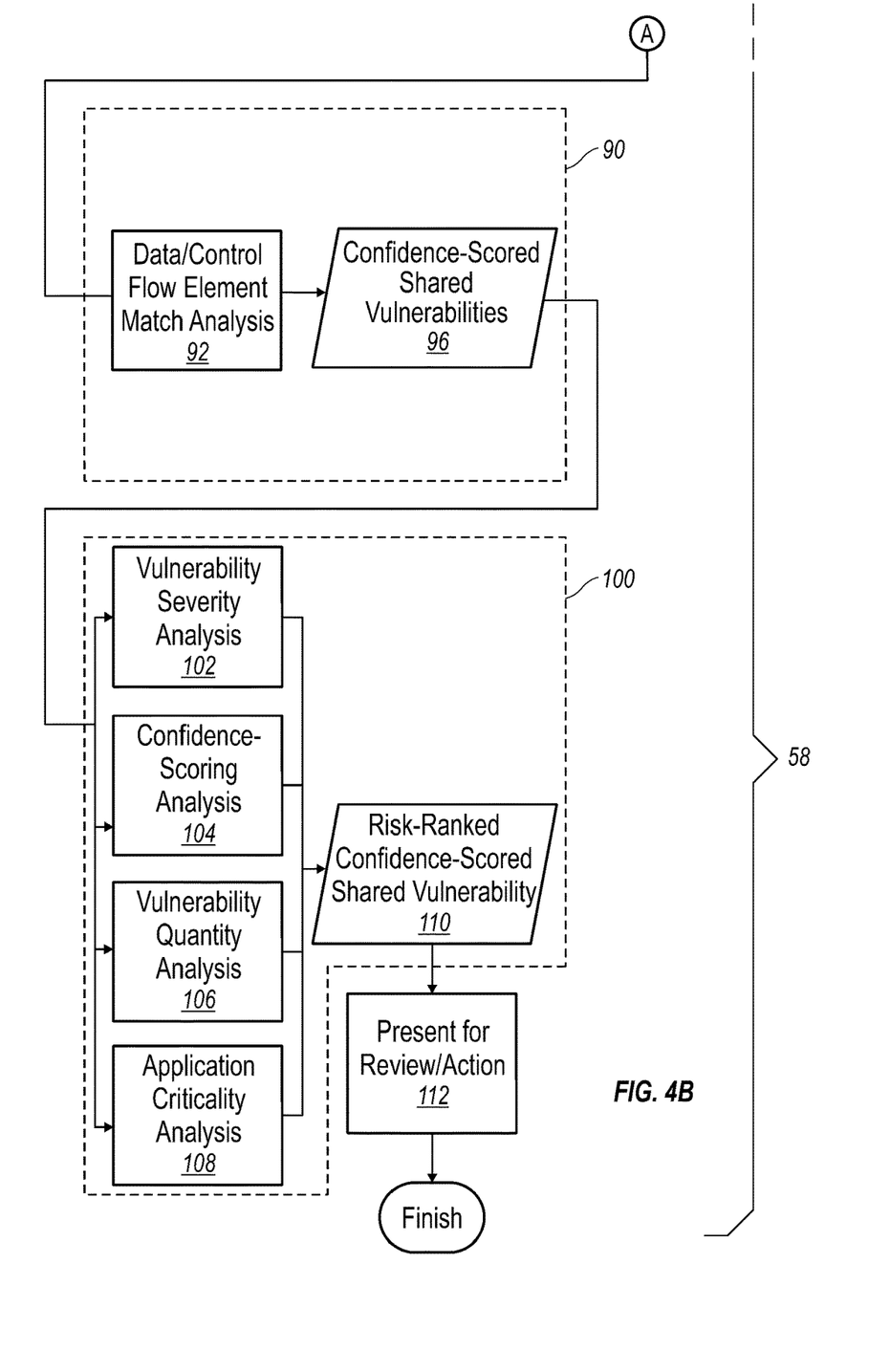

Referring to FIG. 4B, in step 90 the embodiment 58 next determines the strength of the identification and generates a set of confidence-scored shared vulnerabilities 96. Vulnerability confidence scoring is accomplished by taking into account a number of the characteristics of the shared vulnerabilities and giving those characteristic different weights [$Weight_{Match\ Count}$, $Weight_{Application\ Count}$], leading to a confidence score [Confidence Score]. Shared vulnerability characteristics that could be used might include, for example, the number of matching data or control flow elements shared in common for the vulnerabilities [Match Count], the number of applications in which these vulnerabilities are found [Application Count], and the SAST or IAST technologies that identified individual results [Relative $Value_{Technology\ Type}$]. Using these inputs, $$\text{Confidence Score} = (Weight_{Match\ Count} \times \text{Match Count}) +$$
$$(Weight_{Application\ Count} \times \text{Application Count}) +$$
$$(\text{Relative } Value_{Technology\ Type})$$

In step 92, the embodiment 58 determines the number of data/control flow elements matched. Starting with the sink function, step 92 identifies the quantity of shared consecutive data/control flow entries that match. This includes analyzing filenames and package boundaries for vulnerabilities that extend through all of the data/control flow steps. Analysis of the source code filenames within applications and across the portfolio can provide an indicator as to how code is packaged in the organization. Shared vulnerabilities that extend through all of the data/control flow steps in a given package can indicate methods in the underlying components that expose vulnerabilities.

In step 100, the embodiment 58 prioritizes vulnerabilities based on the amount of risk to the organization that would be reduced by remediating the vulnerability. In step 102, the embodiment 58 considers the vulnerability severity [$Severity_{Vulnerabilities}$]. Initial vulnerability severity ranking are typically provided by the SAST or IAST testing technology, but may also be manually overridden by an analyst. The severity is meant to capture the risk the organization is exposed to based on its presence in an application. Each vulnerability is given a weight reflecting its severity [$Weight_{Severity}$]. More serious vulnerabilities are typically more valuable to fix because, in fixing them, more risk is reduced.

Alternatively, in step 104, the embodiment 58 uses the confidence score of the shared vulnerability [$Confidence\ Score_{Vulnerabilities}$] as determined by step 90. A greater confidence that a given vulnerability is, in fact, a shared vulnerability increases the potential value of fixing the upstream vulnerability, and is therefore given more weight [$Weight_{Confidence\ Score}$].

Alternatively, in step 106, the embodiment 58 considers the quantity of vulnerability instances [$Quantity_{Vulnerabilities}$]. Vulnerabilities that recur often throughout the organization are more valuable to fix (and therefore given more weight [Weight$_{Quantity}$] because a single fix, after being pushed to downstream code consumers, results in more risk being reduced.

Alternatively, in step 108 the embodiment 58 considers the criticality of the application(s) [Application Criticality$_{Vulnerabilities}$] in which the shared vulnerability exists. Criticality is typically assigned by an analyst who has evaluated different characteristics of the application, weighted those factors [Weight$_{Application\ Criticality}$], and determined a criticality score. Some factors that can be used for evaluating the criticality of an application could include the types and quantity of the data managed by the application, the exposure of the application to hostile networks such as the Internet, the quantity and characteristics of users allowed access to the application, and technologies used to implement the application. Fixing vulnerabilities in more critical applications that expose organizations to more risk is typically more valuable because breaches involving vulnerabilities in these applications can result in greater damage.

Step 100 may be considered as:

$$\text{Risk Rating} = (Weight_{Severity} \times Severity_{Vulnerabilities}) +$$
$$(Weight_{Confidence\ Score} \times Confidence\ Score_{Vulnerabilities}) +$$
$$(Weight_{Quantity} \times Quantity_{Vulnerabilities}) +$$
$$(Weight_{Application\ Criticality} \times Application\ Criticality_{Vulnerabilities})$$

Figure 6:
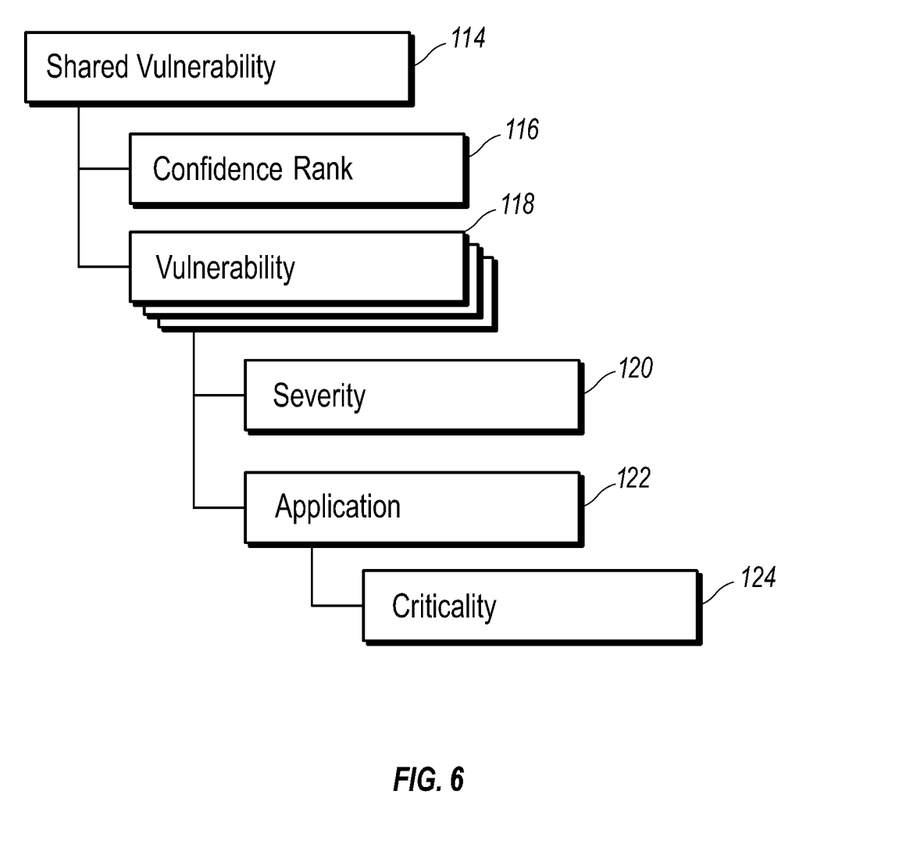
FIG. 6 shows the data structure of a shared vulnerability.

The output of step 100 is a set 110 of risk-ranked, confidence-scored, shared-vulnerabilities, which, in step 112, are presented for remedial action. Referring to FIG. 6, each shared vulnerability 114 within the set includes a confidence ranking 116 and at least two vulnerabilities 118. Each vulnerability 118 includes a severity 120 and an application 122. Each application includes a criticality 124.

The present invention is described in terms of specifically-described embodiment. Those skilled in the art will recognize that other embodiments of such methods can be used in carrying out the present invention. Other aspects and advantages of the present invention may be obtained from a study of this disclosure and the drawings, along with any claims.

The invention claimed is:

1. A method of detecting and analyzing vulnerable code shared between at least two applications comprising the steps of:
   creating a consolidated vulnerability database populated with at least one vulnerability testing result from each of the at least two applications wherein in each vulnerability result comprises a vulnerability type, filename, line number, and data/control flow elements;
   identifying at least one shared vulnerability by:
      comparing a first vulnerability testing result with the remaining vulnerability testing results within the consolidated vulnerability database and recording any vulnerability type, filename and line number matches as vulnerability location matches; and
      comparing the number of data/control flow elements of the first vulnerability testing result with the remaining vulnerability testing results within the consolidated vulnerability database and recording any matches as data/control flow element matches;
   analyzing the at least one shared vulnerability by:
      assigning a confidence to the shared vulnerability based on the vulnerability location matches and the data/control flow element matches;
      assigning a severity to the shared vulnerability type; and
      assigning a criticality to each of the at least two applications from which the shared vulnerability originated from; and
   creating a database of shared vulnerabilities wherein each shared vulnerability is risk-ranked and confidence-scored based on the confidence, the severity, and the criticality.

2. The method of claim 1 further assigning each shared vulnerability a risk rating, the risk rating equal to the sum of a first product, a second product, and a third product, wherein:
   the first product is a severity weight multiplied by the severity of the vulnerability type;
   the second product is a confidence weight multiplied by the confidence of the vulnerability; and
   the third product is a criticality weight multiplied by the criticality of the application in which the vulnerability is detected.

3. The method of claim 2 wherein the confidence is the sum of a first product, a second product, and a relative value of a technology type, wherein:
   the first product is a match count weight multiplied by a match count; and
   the second product is an application count weight multiplied by the application count, the application count being the number of applications in which the shared vulnerability appears.

4. The method of claim 1 wherein the data/control flow elements comprise a filename or package, line number and/or column number, and line text.

5. A method of detecting and analyzing vulnerable code shared between at least two applications comprising the steps of:
   creating a consolidated vulnerability database populated with at least one vulnerability testing result from each of the at least two applications wherein in each vulnerability testing result comprises a vulnerability type, data/control flow elements, and a vulnerability location elements;
   assigning a severity to each vulnerability testing result based on the vulnerability type within the consolidated vulnerability database;
   comparing one of the vulnerability testing results with the remaining vulnerability testing results within the consolidated vulnerability and recording any matches of vulnerability type, data/control flow elements, and a vulnerability location matches as a shared vulnerability candidate;
   assigning a confidence rating to each shared vulnerability candidate based on the vulnerability location element matches and data/control flow element matches; and
   creating a database of shared vulnerability candidates a confidence rating and a severity rating.

6. The method of claim 5 wherein the vulnerability location elements comprise a file name and line number and the data/control flow elements comprise a filename or package, line number and/or column number, and line text.

7. The method of claim 6 further assigning each shared vulnerability a risk rating, the risk rating equal to the sum of a first product, a second product, and a third product, wherein:

the first product is a severity weight multiplied by the severity of the vulnerability type;

the second product is a confidence weight multiplied by the confidence of the vulnerability; and the third product is a criticality weight multiplied by the criticality of the application in which the vulnerability is detected.

8. The method of claim 7 wherein the confidence is the sum of a first product, a second product, and a relative value of a technology type, wherein:

the first product is a match count weight multiplied by a match count; and the second product is an application count weight multiplied by the application count, the application count being the number of applications in which the shared vulnerability appears.

* * * * *